US006961895B1

(12) United States Patent
Beran et al.

(10) Patent No.: US 6,961,895 B1
(45) Date of Patent: Nov. 1, 2005

(54) METHOD AND APPARATUS FOR SYNCHRONIZATION OF TEXT AND AUDIO DATA

(75) Inventors: Peter Beran, Princeton, NJ (US); John Churchill, Princeton, NJ (US); Kenneth Van Allen, Princeton, NJ (US); Tom McCartney, Princeton, NJ (US); David Kozemchak, Princeton, NJ (US); Michael Kinsey, Princeton, NJ (US); James Pritchett, Princeton, NJ (US); Terry Bass, Princeton, NJ (US); Karen Palmer, Princeton, NJ (US); Carter York, Princeton, NJ (US); Amy Steinmetz, Princeton, NJ (US)

(73) Assignee: Recording for the Blind & Dyslexic, Incorporated, Princeton, NJ (US)

( * ) Notice: Subject to any disclaimer, the term of this patent is extended or adjusted under 35 U.S.C. 154(b) by 702 days.

(21) Appl. No.: 09/636,424

(22) Filed: Aug. 10, 2000

(51) Int. Cl.[7] ............................................. G09B 5/06
(52) U.S. Cl. ................................. 715/500.1; 715/500
(58) Field of Search ........................... 715/500, 500.1, 715/512, 515, 501.1; 709/235; 434/317, 434/217; 704/270, 235

(56) References Cited

U.S. PATENT DOCUMENTS

| | | | | |
|---|---|---|---|---|
| 4,124,943 A | * | 11/1978 | Mitchell et al. | ......... 434/307 R |
| 4,425,098 A | * | 1/1984 | Doring | ........................ 434/317 |
| 4,985,697 A | * | 1/1991 | Boulton | ................... 715/500.1 |
| 5,465,240 A | * | 11/1995 | Mankovitz | ..................... 369/1 |
| 5,572,625 A | | 11/1996 | Raman et al. | |
| 5,642,466 A | | 6/1997 | Narayan | |
| 5,687,144 A | | 11/1997 | Nishizawa | |
| 5,695,401 A | * | 12/1997 | Lowe et al. | ................... 463/4 |
| 5,745,782 A | | 4/1998 | Conway | |
| 5,822,284 A | | 10/1998 | Nishizawa | |
| 5,832,171 A | * | 11/1998 | Heist | ........................... 386/46 |
| 5,850,629 A | | 12/1998 | Holm et al. | |
| 5,884,262 A | | 3/1999 | Wise et al. | |
| 5,884,266 A | | 3/1999 | Dvorak | |

(Continued)

OTHER PUBLICATIONS

*Daisy Product Development*, The Daisy Consortium (Nov. 9, 1999).

(Continued)

*Primary Examiner*—Stephen Hong
*Assistant Examiner*—Jonathan Schlaifer
(74) *Attorney, Agent, or Firm*—Darby & Darby

(57) ABSTRACT

A method and apparatus for synchronizing audio data to text data in which the text is manually or automatically divided into an arbitrary number of sections and a text section is selected for display and presented to a narrator for audio input. A human narrator reads the displayed selected section of text into a computer to form an audio data portion for the selected section that is linked to the text by entering synchronization marks to the computer. The sections of text may be selected for reading and audio input in any order and by any number of narrators. Each recorded audio portion is converted to an audio data file and the audio data files are re-sequenced to conform to the original order of the text based on a playback control file. A plurality of narrators may contribute audio data from separate workstations of a network, or workstations which are connected to a central server over a communications network, such as the Internet. After the sections of text and accompanying audio have been properly sequenced and assembled into a single audio/text program, it is stored on a portable computer-readable medium (e.g. a CD-ROM) and a user may select from the playback control file any portion of the text for view and/or select any portion of viewed text and hear the audio portion corresponding thereto.

26 Claims, 8 Drawing Sheets

U.S. PATENT DOCUMENTS

| | | |
|---|---|---|
| 5,898,430 A | 4/1999 | Matsuzawa et al. |
| 5,899,975 A | 5/1999 | Nielsen |
| 5,915,256 A | 6/1999 | Rogers et al. |
| 5,924,068 A | 7/1999 | Richard et al. |
| 5,926,789 A * | 7/1999 | Barbara et al. ......... 704/270.1 |
| 6,003,090 A * | 12/1999 | Puranik et al. ............. 709/235 |
| 6,240,391 B1 * | 5/2001 | Ball et al. .................. 704/270 |
| 6,260,011 B1 * | 7/2001 | Heckerman et al. ........ 704/235 |
| 6,335,768 B1 * | 1/2002 | Reinold et al. ............. 348/723 |

OTHER PUBLICATIONS

*Expand Your Horizons, Lp Studio PLUS*, Lp Studio PLUS Information (Updated Mar. 30, 1999).

* cited by examiner

METHOD AND APPARATUS FOR SYNCHRONIZATION OF TEXT AND AUDIO DATA

BACKGROUND OF THE INVENTION

1. Field of the Invention

The present invention relates to data processing and speech signal processing, and relates more particularly to the synchronization of text or images to speech.

2. Description of the Related Art

Literary works and the like have long been reproduced in differing audio formats for users who may wish to review the work by listening to it rather than reading it. Audio books, for example, have been produced so that people may listen to "books on tape" while driving. Additionally, such audio books have been produced for use by the blind and the dyslexic. These audio books have typically been provided in analog cassette form or on compact-disc (CD-ROM) by having a human narrator in a recording studio read and record the text. In one way of making the recording, one narrator starts at the beginning of the book and continues in page number sequence and continues recording until the end is reached.

There exists an open source data standard called the Digital Audio-Based Information System, or DAISY, by the DAISY Consortium for the creation of digital "talking books". The DAISY standard provides a selectable table of contents by which a user may choose a section of material to be played back audibly.

Some software packages have been introduced using the DAISY standard to produce an audio book. These allow for recordings of the audio data to form the book made by one or more narrators in segments in accordance with a pre-set format. Typical programs are LP STUDIO PLUS and LP STUDIO PRO developed by The Productivity Works and Labyrinth. These programs allow for the creation, management, editing and production of synchronized multi-media materials including the synchronization of audio recordings to text and image data.

In a typical method of generating digital audio books using these prior art software systems, a playback control format is established, such as a navigational control center (NCC) format, based on sections of the source text to be recorded. The NCC predefines sections of synchronizable text prior to recording corresponding audio portions. Audio data for one or more of the text sections is then recorded, in any order. Once the audio portion has been recorded for one or more text sections, a Synchronized Multimedia Integration Language (SMIL) file is generated. Each SMIL file may correspond to one or more of the text sections with the associated audio data of one or more audio portions. In the LP STUDIO products, a skeleton SMIL is generated before the audio portion is recorded and is filled in as the recording is made. Once corresponding audio data portions have been recorded for all sections of the text source, the SMIL files are integrated according to the original definitions provided by the pre-established NCC and placed on a medium for audio playback by a user.

For a typical audio recording of a commercial type talking book, a single narrator reads the entire text. Situations may exist in which it is not economically feasible to have one narrator do this and a group of volunteer narrators is to be used each to record audio data for one or more sections. This particularly is advantageous in charitable type work, such as in producing talking books for the blind or dyslexic. The plurality of narrators are to record the audio data in a rather unstructured manner. That is, one volunteer may have time only to record one segment, a volunteer works periodically, and several volunteer narrators are available to record data at the same time.

For the above described prior art and other recording systems, once the NCC file has been defined, it can not be altered without recreating an entirely new data structure. This limits the ability of the ordering sequence and other attributes of the text files once the NCC has been established. Accordingly, it would be preferable to introduce a more narrator-friendly method and system for generating digital audio books whereby the formatting of sections of text to be recorded can be freely changed without having to redefine the entire NCC structure. This is particularly useful in an application where a number of different narrators, usually volunteers, are to produce a talking book by reading different sections of the same text source.

BRIEF SUMMARY OF THE INVENTION

In order to address and solve certain of the foregoing shortcomings in the prior art of talking books, the present invention provides a method and system for synchronizing audio data for use in the production of a digital talking book. The method includes dividing stored data from a text source, such as a novel or a textbook, into a plurality of sections. The text sections can be a single page or specific group of pages, or chapter or a selected number of words of the original text source. Each text section is tagged so that it can be identified.

A narrator accesses a text section that he/she is to record. The text section is displayed on a computer screen and the narrator reads the section out loud. The section that is read is recorded as an audio portion in digital format. The audio data portions may be recorded in any standardized format, such as a WAV or MP3 format. When recording, the narrator presses a "mark" button to indicate the start of each section of text to be synchronized (the synchronization points are based on the text markup). The time points at which the mark button is pressed is stored in a "time stamp data" (TSD) file. At any time, the TSD file can be converted (via the software of the system) to SMIL format. When all SMIL files for the text source have been generated, the NCC is built (via the software) from the data found in the SMIL and a Book Project Management (BPM) file. The BPM identifies the text markup elements to be included in the NCC (e.g., certain kinds of headings). These elements are extracted from the source text and are linked to the corresponding SMIL files to be available to create a Daisy-compliant digital talking book. The final product of the group of SMIL files and NCC file is reproduced on a medium, such as on a CD ROM or other portable medium, for use by the person who wishes to hear the talking book. Such user places the CD in a computer or other player device, such as a digital talking book reader, and accesses the program in selected sections based on the NCC to hear the recorded text data.

In summary, a plurality of audio portions, each corresponding to a text section, are recorded by the same or different narrators. Since the text sections are tagged, the generation of the audio portions can take place in any desired sequence, random or ordered, and different narrators can generate different audio portions. The narrators may record their audio data on the same computer at different times or on separate computers at the same time or on networked computers, either at different times or simultaneously.

In accordance with a preferred embodiment of the present invention, a narrator may change the order of the first selection of text data and a second selection. The system will then re-sequence the first audio data and the second audio data for playback based on the new order of the text selections. Thus, the present invention provides an advantage in that audio data corresponding to text data on a computer may be recorded in any order by any number of people, and later re-sequenced if the order of text sections or length of recorded audio portions is changed.

BRIEF DESCRIPTION OF THE DRAWINGS

Further objects and advantages of the present invention will be more readily appreciated upon review of the detailed description of the preferred embodiments included below when taken in conjunction with the accompanying drawings in which.

DETAILED DESCRIPTION OF THE INVENTION

Referring now to FIGS. 1–4D, wherein similar components of the instant invention are referenced in like manner, a preferred apparatus for synchronizing audio and text or image data, and accompanying methods for using the same, are disclosed.

Figure 1:
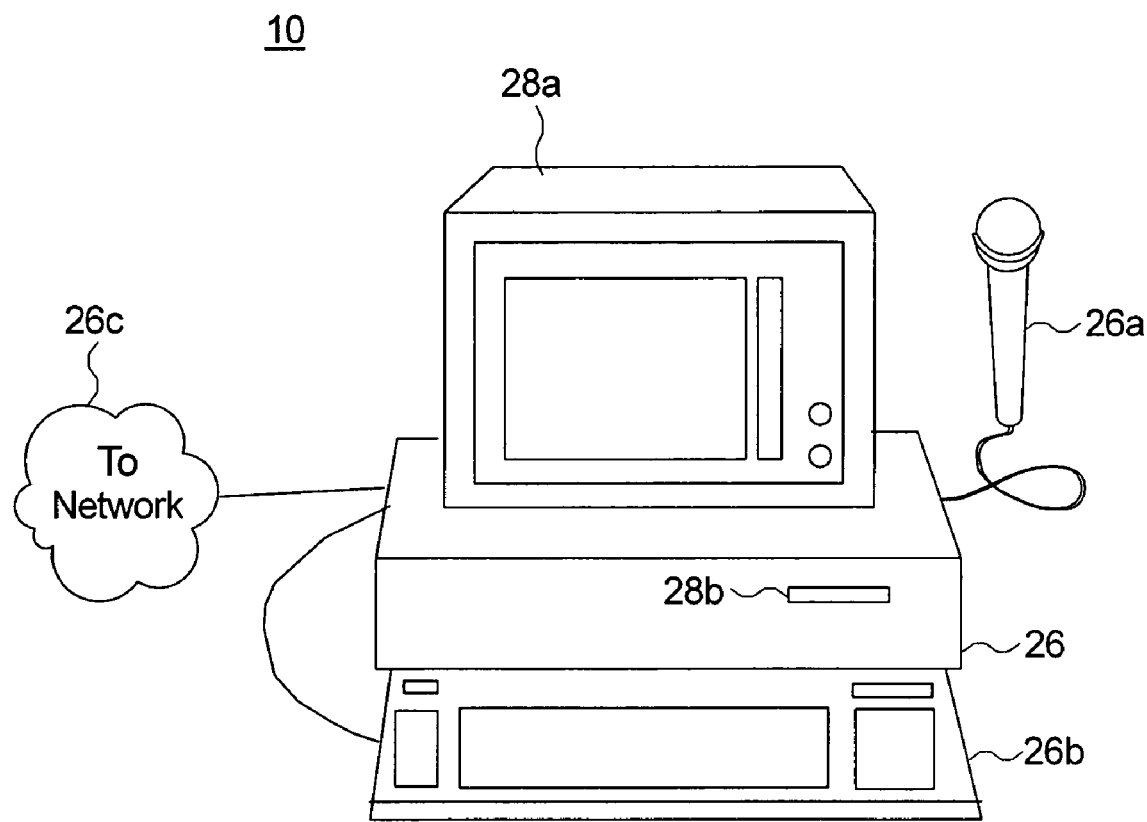
FIG. 1 depicts an exemplary computer system for use with the present invention.

Depicted in FIG. 1 is an exemplary computer workstation 10 to be used by a narrator and for synchronizing audio and text data according to the present invention. Workstation 10 is to be used by a person who is to read (narrate) and record data from the text source, such as a book. Hereafter, such person who inputs audio data is referred to as a "narrator" as distinguished from the person who listens to the playback and is called a "user". There can be a plurality of the workstations at different locations to accommodate a plurality of narrators.

Each workstation can operate on a stand alone basis or be linked as part of network. Each workstation preferably includes a computer and several external interface devices. The computer has the necessary processing components and power to perform its intended functions either on a stand-alone basis or to serve as an input to one or more other central computers or servers. The workstation includes a display 28a by which a narrator may view, inter alia, text information that is to be read and recorded. An audio input device 26a, such as a microphone, is provided to record an audio file corresponding to the text as read by the narrator. A command input device 26b, such as a keyboard, may be used by the narrator to input appropriate commands to the workstation 10 in accordance with the present invention.

In certain embodiments of the present invention as described below, it is desirable for workstation 10 to communicate with other computer workstations across a network. Accordingly, a network connection 26c may be used by workstation 10 to send text data to and receive further audio data, commands and the like from remote narrators connected to the network. Network connection 26c may be a local area network (LAN), a wide area network (WAN), an intranet connection or a connection to the Internet.

It is preferred that text and audio data be combined in accordance with the present invention and distributed to users who may wish to view and hear the combined audio/text data. Accordingly, a portable media reader/writer 28b, such as a floppy disk drive or a compact disk reader/writer, may be included to save a synchronized audio/text work on a portable, computer-readable medium after it has been completed.

Figure 2:
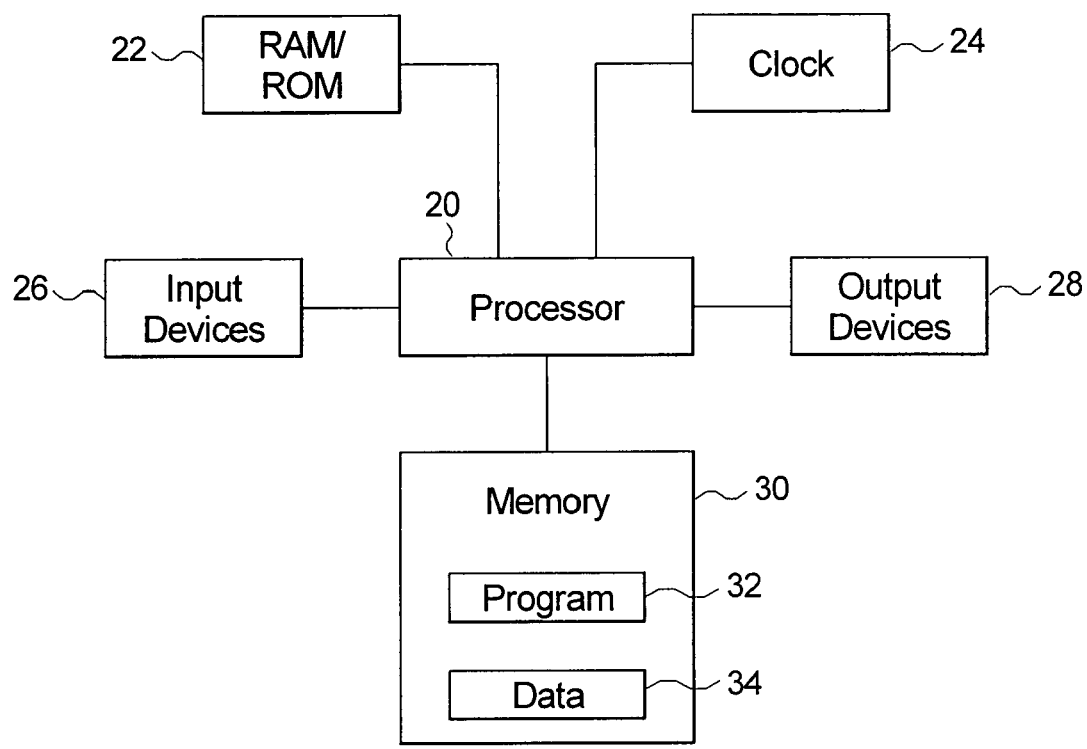
FIG. 2 is a schematic block diagram illustrating exemplary components of the computer system of FIG. 1.

FIG. 2 shows an example of the internal components of computer workstation 10 which may be necessary to implement the present invention. The primary component of computer workstation 10 are conventional and include a processor 20, which may be any commonly available microprocessor such as the PENTIUM III manufactured by INTEL CORP. The processor 20 is shown operatively connected to a memory 22 having RAM (random access memory) and ROM (read only memory) sections. There also is a clock 24, a memory 30 (which stores one or more operating system and application programs 32), and the input device(s) 26 and output device(s) 28.

The processor 20 operates in conjunction with the RAM/ROM in a manner well known in the art. The random-access memory portion of RAM/ROM 22 may be a suitable number of Single In-line Memory Module (SIMM) chips having a storage capacity (typically measured in megabytes) sufficient to store and transfer, inter alia, processing instructions utilized by the processor 20 which may be received from the application program 32. The read-only memory (ROM) portion of RAM/ROM 22 may be any permanent non-rewritable memory medium capable of storing and transferring, inter alia, processing instructions performed by the processor 20 during a start-up routine of the computer workstation 10. The ROM can be on-board of the microprocessor. Further functions of RAM/ROM 22 will be apparent to those of ordinary skill in the art.

The clock 24 typically is an on-board component of the processor 20 which has a clock speed (typically measured in MHz) which controls the processor 20 performs and synchronizes, inter alia, communication between hardware components of the computer workstation 10. Further functions of the clock 24 are known to one of ordinary skill in the art.

The input device(s) 26 may be one or more commonly known devices used for receiving narrator inputs and/or audio data, and transmitting the same to the processor 20 for processing. Accordingly, the input device(s) 26 may include the microphone 26a, the keyboard 26b, the network connection 26c, a mouse, a dedicated command button, a joystick, a voice recognition unit with appropriate software, and the like. Input device(s) 26 may further be any number of other devices and/or software which are operative to allow a narrator or operator to enter instructions, values, audio data and the like to computer workstation 10 in accordance with the present invention.

Output device(s) 28 may be one or more commonly known devices used by the computer workstation 10 to communicate the audio and/or textual data, results of entered instructions, and the like to a narrator or operator of the computer workstation 10. Accordingly, the output device(s) 28 may include the display 28a, the portable-media writer 28b, a voice synthesizer, a speaker, a network connection 26c, and any other appropriate devices and/or software which are operative to present data or the like to the narrator or operator of the computer workstation 10.

The memory 30 may be an internal or external large capacity device for storing computer processing instructions, audio information, video information and the like, the storage capacity of the device typically being measured in megabytes or gigabytes. Accordingly, the memory 30 may be one or more of the following: a floppy disk drive, a hard disk drive, a CD-ROM disk and reader/writer, a DVD disk and reader/writer, a ZIP disk and a ZIP drive of the type manufactured by IOMEGA CORP., and/or any other computer readable medium that may be encoded with processing instructions in a read-only or read-write format. Further functions of, and available devices for, memory 30 will be apparent to one of ordinary skill in the art.

The memory 30 stores, inter alia, a plurality of programs which may be any one or more of an operating system such as WINDOWS 98 by MICROSOFT CORP, and an application program 32 (described below), as well as audio, text and synchronization data 34 which is necessary to implement the embodiments of the present invention.

FIGS. 3A–3D show the steps implemented by the application program used for generating synchronized audio and text data in accordance with the invention. The application program is loaded into the computer. The process begins at step 31 with the book or other complete text is selected as the source for generating the audio book. The text from the book is scanned or manually entered to create a computer readable source text (step 32). The source text is stored in a computer-readable format, such as ASCII, HTML or XML on any desired media, such as the computer internal memory or hard disk or on a CD, to be used by the computer, etc.

A Book Project Management (BPM) file is generated in step 34. The BPM contains bibliographical and identifying information about the book (e.g., title, ISBN); a list of the marked up source text files to use; the order of these files; a list of the markup elements in the source files to be used as synchronization points; and a list of the markup elements to be included as high-level navigation items in the NCC. The BPM file can be created by a person through the system software, or it can be created through an automated process outside of the system.

The markup tags elements, or synchronization points are applied to the source text document (Step 36). These tags define the text sections to be recorded by the narrator(s). Then tags are to be time stamped to be available for association with the audio data portions corresponding to the text sections. As indicated, these markup tags are inserted, typically in a separate process, based on attributes of the text (i.e. each chapter heading), by word count, page count. In a typical application where there are to be a number of different volunteer narrators, each page of a text is marked as a section. Text in between two such markup tags are referred to herein as a text section. The markup tags are for display to the narrator to indicate the section as the reading/recording is performed.

Once the book project management file has been created, the source text document can be displayed to a narrator a section at a time with a synchronization icon (visual indicator) inserted at each location corresponding to a markup tag. The displayed text is preferably in an HTML or XML format. In a typical application there is a list of unread sections of the text source for which audio information is to be supplied by the narrator. The list can contain data on the length of the sections. The volunteer narrator selects a section for where he/she wishes to record audio data. That section is then displayed.

An audio portion corresponding to the text section selected is then recorded by the narrator (step 38). The text sections can be selected for recording as audio portions in any order. The audio portion or portions selected to be read by a narrator are displayed on the display screen and read into the microphone 26a attached to the computer 10. In a preferred embodiment of the invention, the text section for which audio data is being inputted is automatically scrolled and highlighted on the display screen as it is read. This is done to relieve the monotony of the narrator. It is also preferred that the scroll rate be adjustable.

The application program is preferably equipped with functions such as to allow recording levels to be established and altered. Further controllable recording functions can be audio sampling rates, audio bit sizes, audio data storage formats, and the like.

As the narrator begins to read, audio data corresponding to the text is recorded in digital format in the computer memory. The operator may activate a mark button 86, such as is displayed in FIG. 4A below. Activation of the mark button 86, instructs the computer that the following audio portion is to be recorded and synchronized to the displayed text. The mark button may be a virtual button on the display 28a of the workstation 10 or may be an assigned key on the keyboard 26a. Once the mark button 86 has been activated, the synchronization icon, such as icon 96a described with reference to FIG. 4D below, which corresponds to the displayed text section being recorded, may change appearance to reflect that the section is being recorded.

Once recording of the audio portion for the text section has been completed, the narrator may activate the mark button 86 again. A timestamp data file is generated by the application program to denote that the recorded audio data between the two activations of the mark button corresponds to the displayed text section. Further functions relating to the recording of audio data are provided below with respect to FIG. 3B. A recorded audio portion may then be edited or re-recorded if necessary (step 40), as described below with respect to FIG. 3C.

The application program preferably generates an SMIL file upon completion of each recording audio portion (step 42). Alternatively, a plurality of SMIL files may be created once recording of all audio portions made by a volunteer or group of volunteers have been completed. Each SMIL file contains data which synchronizes a recorded audio portion to the corresponding text section. After all of the SMIL files for the complete text have been created, they are assembled in the appropriate sequence and stored in memory 30. A playback control file, such as an NCC file is then generated and stored (step 44). The NCC is described in the DAISY 2.0 specification (available at www.daisy.org). The NCC is an HTML file that contains the text of all points of high-level navigation (e.g., chapters, section headings, pages). It also contains links from these items to the appropriate points in the SMIL files that describe the overall text-audio synchronization.

The audio data, text data, SMIL files and the NCC file are saved onto a portable medium for distribution to end users (step 46). Said users would be, for example, a handicapped, blind or dyslexic person. The material on the medium is the complete original text source and the digitally recorded audio representation thereof. The portable medium can be any of a CD-ROM, a DVD-ROM, a floppy disk, a ZIP disk, and/or any other standard, portable, computer-readable medium by which such programs may be distributed to users. However, it is to be understood that the combined audio/text data may be saved and stored on an Internet web site, or other centrally-accessible network address such as a bulletin-board system (BBS). Users then may connect to the Internet or the network where they may access the combined audio/text data.

Access is accomplished by the user placing the medium in a computer that has audio playback capabilities and preferably a display so that the NCC program can be displayed. This gives a navigational map of the material on the medium. The user, or a person assisting him, then selects a section of the text to be played back in an audio form. This can be done in any sequence and the user can start and stop the playback at any time. As the audio playback takes place, the text also can be displayed if desired.

Figure 3A:
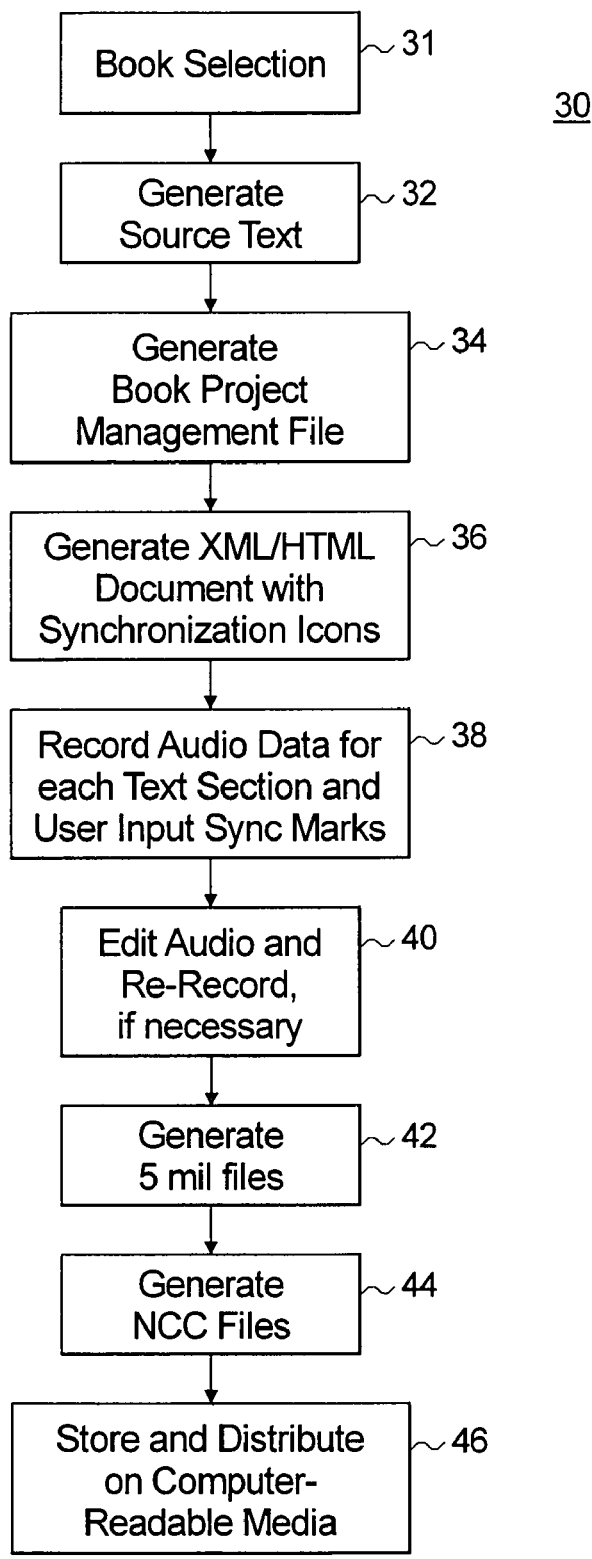
FIGS. 3A–3C are block diagrams illustrating exemplary steps of a program according to one embodiment of the present invention for synchronizing audio and text data using the computer system of FIG. 1.
Figure 3B:
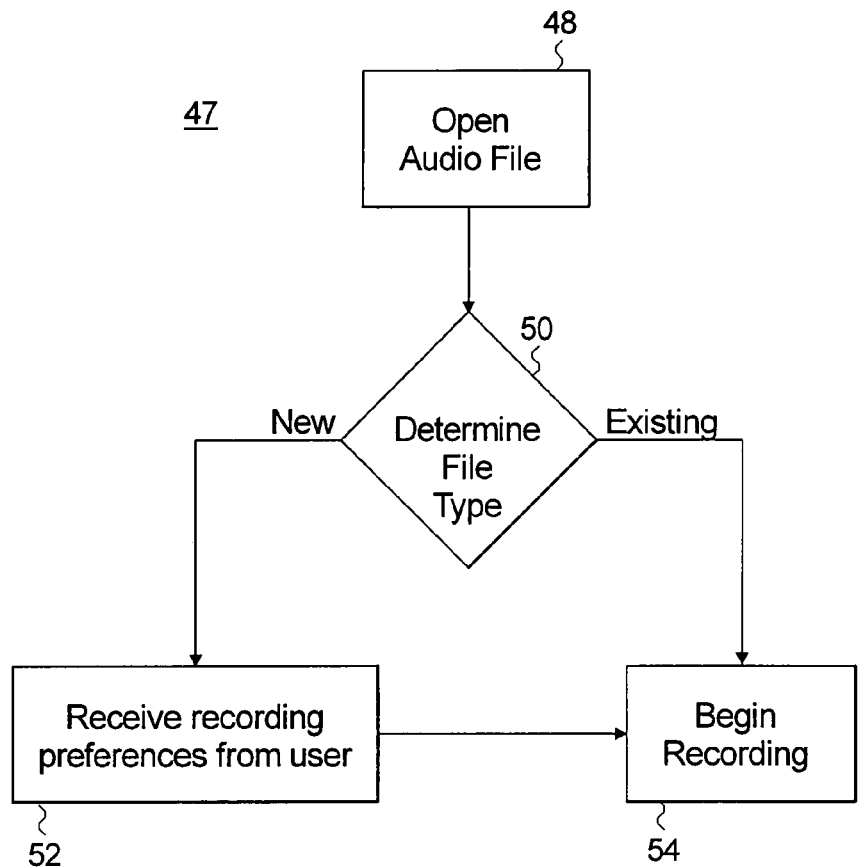

FIG. 3B shows a process 47 for recording or re-recording audio data. This can be done by the original narrator who inputted the audio portion or by a technician or another narrator. The person making the correction indicates that an audio file is to be opened (step 48). At step 50, it is determined whether a new audio file is to be created or whether an old file is to be re-recorded (step 50). If a new file is to be created, recording preferences are received from the user in step 52. Then recording begins in step 54. If an existing file is to be used, it is retrieved and the user begins recording data at step 54.

In a preferred embodiment of the invention, if an audio portion is to be edited, it is easier to re-record the portion. If the audio needs to be re-recorded, the narrator may change the status of the corresponding text section(s) to indicate the same. The synchronization icon corresponding to the text section(s) that to have a re-recorded portion reverts from a "recorded" indication to an "unrecorded" indication.

Figure 3C:
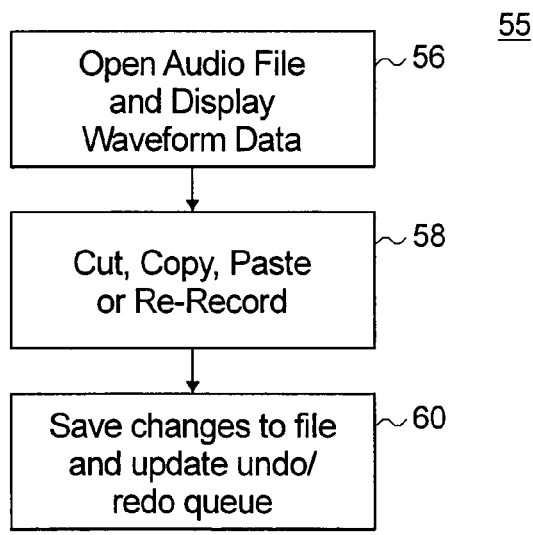

FIG. 3C shows an exemplary process 55 for editing recorded audio data. This can be done instead of re-recording the section. First, a previously recorded audio file is opened (step 56). If the audio recording has any undesirable features, such as a long pause, high background noise, mispronunciations, and the like, the editing utility may be used to edit out the undesirable portions (step 58).

If editing functions were performed, the changes may be saved to the memory 30 (step 60). Furthermore, it is preferred that an undo/redo queue be provided by the application program so that any changes may be tracked an undone, if necessary.

Figure 4A:
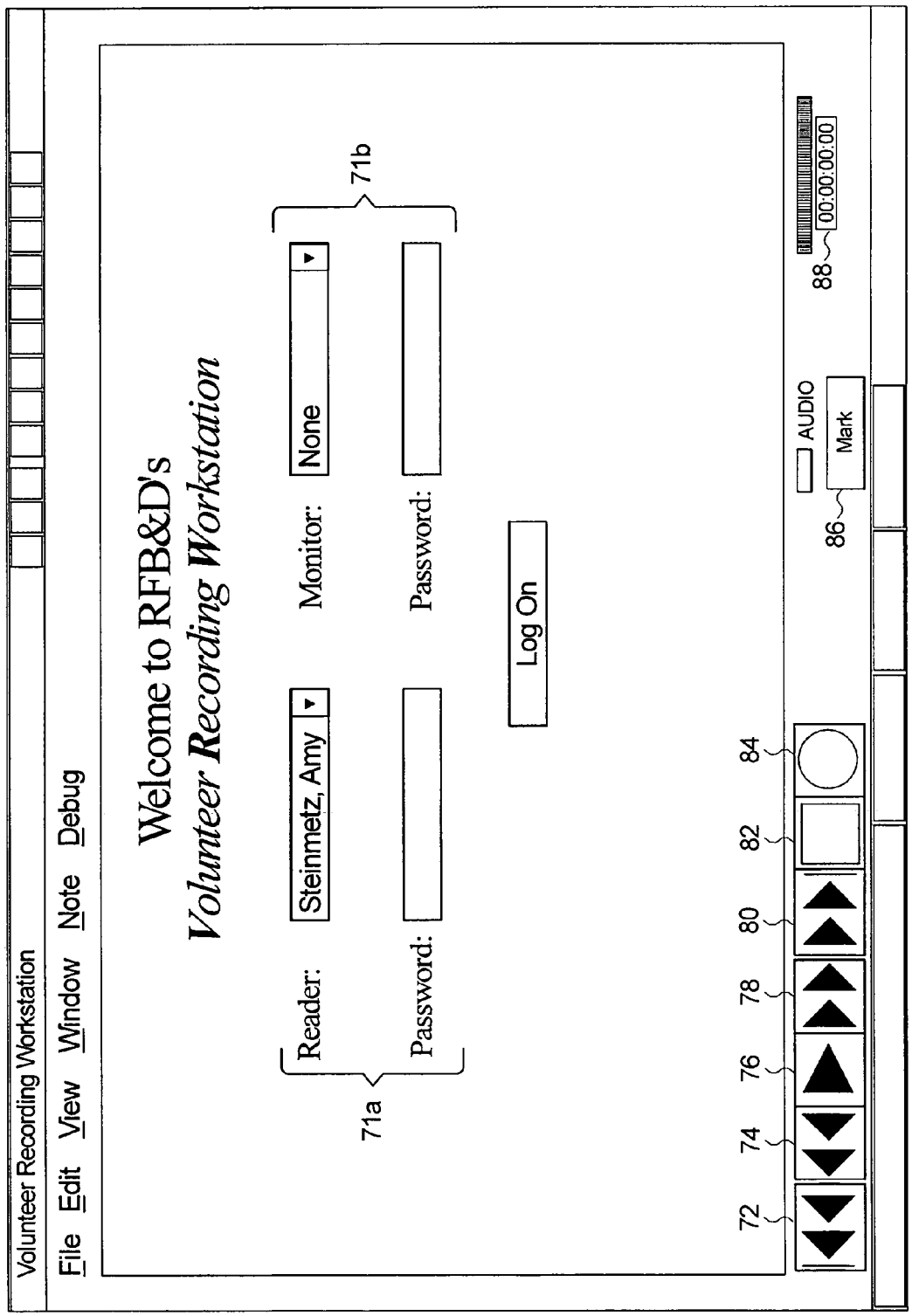
FIGS. 4A–4D are illustrations of various exemplary screen displays of a computer program according to one embodiment of the present invention.
Figure 4B:
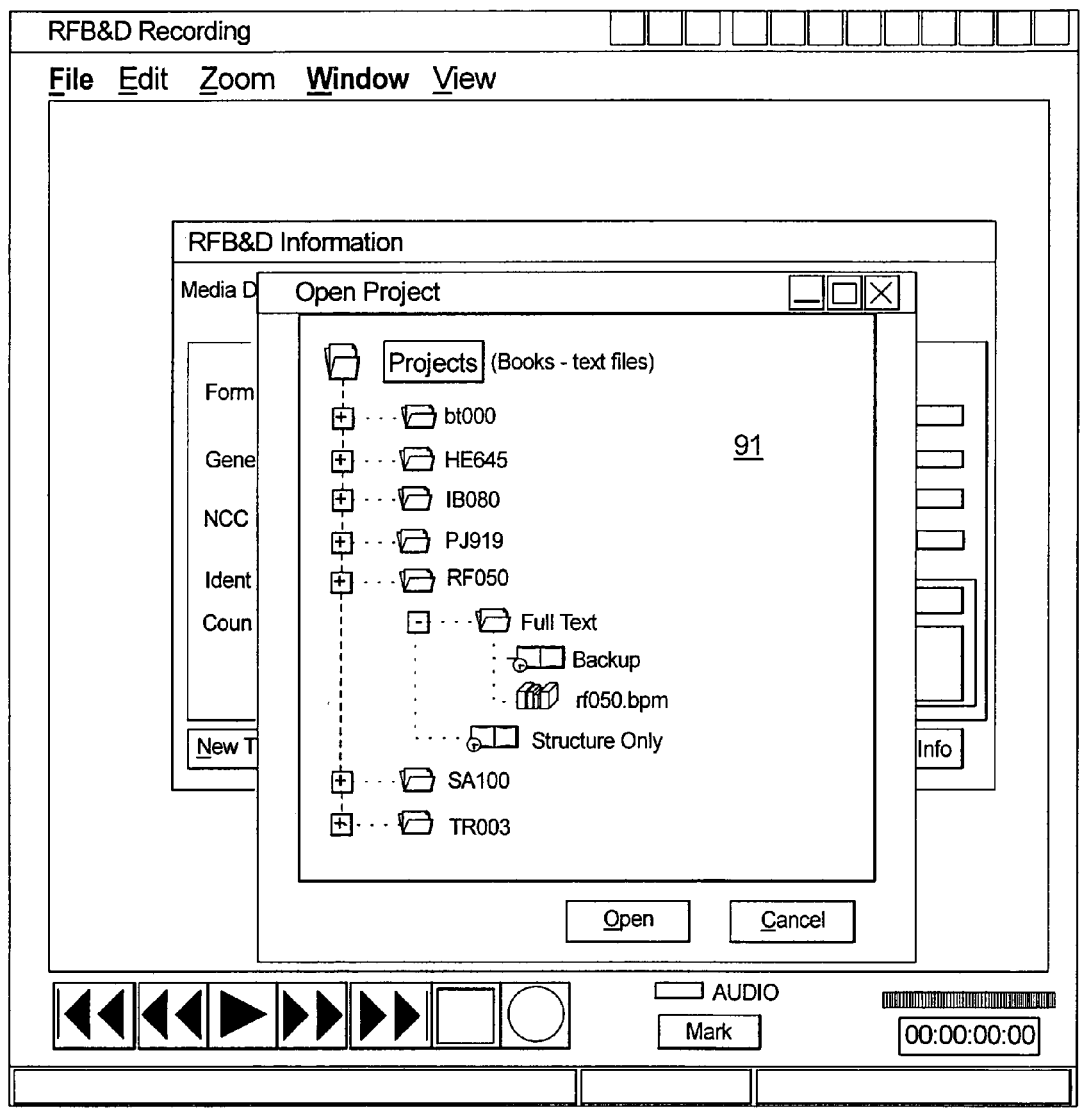
Figure 4C:
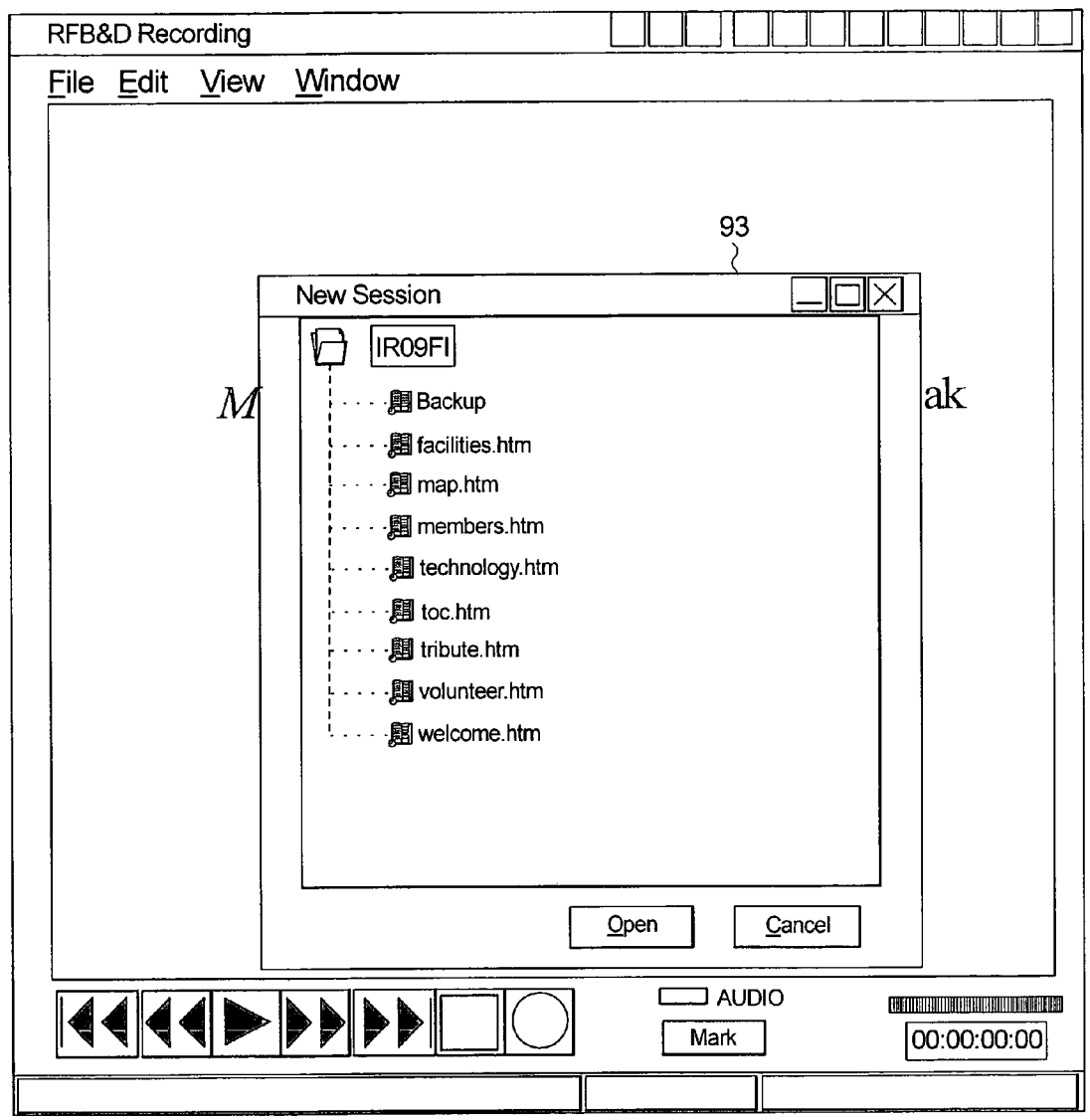

FIGS. 4A–4C show exemplary screen displays, 70, 90, 92 and 94 generated by the application program. In FIG. 4A, there is depicted a login screen display 70 which is presented upon execution of the application program. The display 70 includes one or more lines 71a for accepting narrator login data, including narrator identification and a password. A second set of lines 71b may optionally be provided to login a monitor or supervisor who is monitoring, for example, a recording session. The display 70 may contain further narrator-actuable buttons 72–86 which may be used during the recording session. A clock 88 may further be displayed which indicates recording time of a particular recording session. Buttons 72–86 and clock 88 may be displayed during the entire time that application 82 is running.

Button 72–86 include a full rewind button 72, a rewind button 74, a play button 76, a fast-forward button 78, a fast-forward to end button 80, a stop button 82, a record button 84, and a mark button 86. Full rewind button 72 allows the narrator to instruct the computer 10 to return to the start of a recorded audio portion. Rewind button 74 allows the narrator to instruct the computer 10 to return to a part of a recorded audio portion. Play button allows a narrator to instruct the computer 10 to play a part of a recorded audio portion from a current position of the audio portion. Fast forward button 78 allows a narrator to instruct the computer 10 to move to a later portion of the recorded audio portion. Fast forward to end button 80 allows a narrator to instruct the computer 10 to move forward to the end of a recorded audio portion. Stop button 82 allows a narrator to instruct the computer 10 to stop a playback or recording of an audio portion. Record button 84 allows the narrator to instruct the computer 10 to record from a current point in the audio portion. The function of mark button 86 was described above with respect to FIG. 3A. Each of buttons 72–86 may be disabled until the narrator displays a section of text to be recorded.

FIG. 4B shows a second screen display 90 wherein a dialog box 91 is presented after a narrator logs in. Dialog box 91 may display all current book projects for which audio data is being stored. A narrator may select one of the book projects before proceeding to record an audio section.

Referring now to FIG. 4C, after a book project has been selected, a third screen display 92 is displayed which includes a second dialog box 93. The dialog box 93 includes a list of text files for which audio data is to be recorded. The narrator may then select a particular text file.

Figure 4D:

Referring now to FIG. 4D, after a text file has been selected, a fourth screen display 94 is presented. The display 94 may show text sections and accompanying synchronization icons 96a–96e which indicate whether audio data has been recorded for the corresponding text section. A narrator selects a text section to record, or the application program may designate which text section is to be recorded. Once the text has been selected, buttons 72–86 may be activated for the narrators use.

In a preferred embodiment of the foregoing system, the combined audio/text program that is finally created may present the entire stored text file to a user and may play back the audio files which correspond to the displayed text in order for the displayed text.

Although the invention has been described in detail in the foregoing embodiments, it is to be understood that they have been provided for purposes of illustration only and that other variations both in form and detail can be made therein by those skilled in the art without departing from the spirit and scope of the invention, which is defined solely by the appended claims.

We claim:

1. A method for synchronizing audio data to text data from a source, the method comprising:

segregating a source text data of a given format into a plurality of text sections;

delimiting each of the segregated text sections with a user interactive synchronization point;

providing a user interactive mark button associated with each segregated text section;

displaying at least one of the text sections, the delimiting synchronization point, and the associated mark button on a display;

associating the synchronization point with a time stamp upon a user's first activation of the mark button;

recording, in any order, audio data portions each corresponding to a text section;

producing a timestamp data file entry upon a user's subsequent activation of the mark button at the completion of the recording step;

converting each recorded audio portion into an audio data file;

assembling the audio data files in a sequence corresponding to the given format of the source text data; and generating for said assembled data files a playback control file indicating points of navigation of the source text data.

2. The method of claim 1 wherein said playback control file contains links to corresponding points of navigation of said audio data files.

3. The method of claim 1 wherein a said text section correspond to any one of a chapter, page or word count of the source text data.

4. The method of claim 1 wherein a narrator reads a selected text section to form an audio portion and produces a mark of the beginning and end of the text section recorded as an audio portion to mark the points for converting to an audio data file.

5. The method of claim 1 further comprising the steps of
placing the assembled audio data files and playback control file on a medium for audio playback of said audio data files and display of said playback control file.

6. The method of claim 5 wherein said playback control file contains links to corresponding points of navigation of said audio data files.

7. The method of claim 5 further comprising the steps of
a user selecting a text section to be played back by selecting the section from the display; and
audio reproduction of the selected text section.

8. The method of claim 7 wherein the source data text is placed on the medium and the text is displayed upon selection from the playback control file.

9. The method of claim 1 wherein the audio portions are recorded by one or more narrators in any sequence and at any time or times.

10. The method of claim 9, wherein the audio data is produced by at least two narrators located at the same or separate computer terminals.

11. The method of claim 10, wherein the computer terminals are linked to a network of at least one of a local area network, a wide area network, an intranet, and an Internet connection.

12. The method of claim 1, wherein the text data is stored in at least one of an HTML format and a XML format.

13. The method of claim 1, further comprising:
storing the playback control data, the audio data and the text data on a portable computer-readable medium.

14. The method of claim 12, wherein the portable computer-readable medium comprises at least one of a CD-ROM, a DVD-ROM, a ZIP disk, and a floppy disk.

15. Apparatus for synchronizing audio data to a plurality of text data sections of a source text, comprising:
a computer including means for recording, in any order, audio data portions each corresponding to a text section;
means for embedding synchronization points in the plurality of text data sections, wherein the synchronization points include means for selecting one of the plurality of text data sections through user interaction;
means for correlating an interactive mark button to at least one of the plurality of text sections;
means for displaying at least one of the plurality of text sections, the synchronization points, and the mark button on a display;
means for associating the synchronization point with a time stamp upon a user's first activation of the mark button;
means for producing a timestamp data file entry upon the user's subsequent activation of the mark button;
means for converting each recorded audio portion into an audio data file;
means for assembling the audio data files in a sequence corresponding to the given format of the source text data; and
means for generating for said assembled data files a playback control file indicating points of navigation of the source text data.

16. Apparatus as in claim 15 wherein said playback control file contains links to corresponding points of navigation of said audio data files.

17. Apparatus as in claim 15 further comprising:
means for receiving a medium having recorded thereon said audio files and said playback control file;
means for displaying said playback control file; and
means for playing back in audio form the data of an audio file selected from the displayed playback control file.

18. Apparatus as in claim 17 wherein said text data sections are recorded on said medium and said display means displays the text section corresponding to the selected audio portion.

19. A method of synchronizing audio data to text data from a source, the method comprising:
segregating a source text data of a given format into a plurality of text sections;
delimiting each of the segregated text sections with a user interactive synchronization point;
providing a user interactive mark button associated with each segregated text section;
displaying at least one of the text sections, the delimiting synchronization point, and the associated mark button on a display;
associating the synchronization point with a time stamp upon a user's first activation of the mark button;
recording, in any order, audio data portions each corresponding to a text section;
producing a timestamp data file entry upon a user's subsequent activation of the mark button at the completion of the recording step;
converting each recorded audio portion into an audio data file;
assembling the audio data files in a sequence corresponding to the given format of the source text data; and
after each audio data file has been assembled in the sequence corresponding to the given format of the source text data, generating for said assembled data files a playback control file indicating points of navigation of the source text data.

20. An apparatus for synchronizing audio data to a plurality of text data sections of a source text, comprising:
a computer including means for recording in any order audio data portions each corresponding to a text section;
means for embedding synchronization points in the plurality of text data sections, wherein the synchronization points include means for selecting one of the plurality of text data sections through user interaction;
means for correlating an interactive mark button to at least one of the plurality of text sections;
means for displaying at least one of the plurality of text sections, the synchronization points, and the mark button on a display;
means for associating the synchronization point with a time stamp upon a user's first activation of the mark button;
means for producing a timestamp data file entry upon the user's subsequent activation of the mark button;

means for converting each recorded audio portion into an audio data file;

means for assembling the audio data files in a sequence corresponding to the given format of the source text data; and means for generating, after each audio data file has been assembled in the sequence corresponding to the format of the source text data, a playback control file for said assembled data files indicating points of navigation of the source text data.

21. The method of claim 1, wherein the recording step further comprises the step of editing the recorded audio data.

22. The method of claim 21, wherein the editing step includes the steps of inserting, deleting, and replacing the recorded audio data.

23. The apparatus of claim 15, further comprising means for providing editing functionality, wherein the editing functionality includes insertion, deletion and replacement of the recorded audio data.

24. The method of claim 19, wherein the recording step further comprises the step of editing the recorded audio data.

25. The method of claim 24, wherein the editing step includes the steps of inserting, deleting, and replacing the recorded audio data.

26. The apparatus of claim 20, further comprising means for providing editing functionality, wherein the editing functionality includes insertion, deletion and replacement of the recorded audio data.

* * * * *